United States Patent
Min et al.

(10) Patent No.: US 8,935,541 B2
(45) Date of Patent: *Jan. 13, 2015

(54) METHOD AND APPARATUS FOR ENCRYPTING AND PROCESSING DATA IN FLASH TRANSLATION LAYER

(75) Inventors: Chang-Woo Min, Seoul (KR); Jin-Ha Jun, Seoul (KR)

(73) Assignee: Samsung Electronics Co., Ltd (KR)

( * ) Notice: Subject to any disclaimer, the term of this patent is extended or adjusted under 35 U.S.C. 154(b) by 39 days.

This patent is subject to a terminal disclaimer.

(21) Appl. No.: 13/569,713

(22) Filed: Aug. 8, 2012

(65) Prior Publication Data

US 2012/0303880 A1    Nov. 29, 2012

Related U.S. Application Data

(63) Continuation of application No. 12/017,723, filed on Jan. 22, 2008, now Pat. No. 8,261,098.

(30) Foreign Application Priority Data

Jan. 22, 2007 (KR) ...................... 10-2007-00006593

(51) Int. Cl.
*G06F 12/14* (2006.01)
*H04L 29/06* (2006.01)
*H04L 9/00* (2006.01)
*H04L 9/28* (2006.01)
(Continued)

(52) U.S. Cl.
CPC ........ *G06F 12/1408* (2013.01); *G06F 21/6209* (2013.01); *G06F 3/0679* (2013.01);
(Continued)

(58) Field of Classification Search
CPC ............... G06F 21/10; G06F 21/6218; G06F 2221/2107; G06F 21/6209; G06F 12/0246; G06F 3/0679; G06F 21/79; G11B 20/0021; G11B 20/00086; H04L 9/12; H04L 9/18; H04L 9/06
USPC .............. 713/193, 165; 380/262, 264, 44, 28; 726/22, 26, 34; 711/103, 163, 164; 707/698
See application file for complete search history.

(56) References Cited

U.S. PATENT DOCUMENTS 7,325,115 B2    1/2008    Leis et al.
7,526,625 B2    4/2009    Ebara et al.
(Continued)

FOREIGN PATENT DOCUMENTS

KR    1020040093472    11/2004
KR    1020040099401    11/2004
(Continued)

*Primary Examiner* — Aravind Moorthy
(74) *Attorney, Agent, or Firm* — The Farrell Law Firm, P.C.

(57) ABSTRACT

A method and apparatus for preventing a user from interpreting optional stored data information even when the user extracts the optional stored data, by managing data associated with a flash memory in a flash translation layer, the method comprising searching at least one page of the flash memory when writing data to the flash memory, determining whether authority information corresponding to respective searched pages includes an encryption storage function, generating, corresponding to respective searched pages, a page key according to an encrypting function when the authority information includes the encryption storage function encrypting the data using the generated page key and storing the encrypted data in the respective searched pages, and storing the data in the respective searched pages without encryption when the authority information does not include the encryption storage function.

16 Claims, 5 Drawing Sheets

(51) Int. Cl.
*G06F 12/16* (2006.01)
*G06F 17/30* (2006.01)
*G08B 29/00* (2006.01)
*G06F 12/00* (2006.01)
*G06F 17/00* (2006.01)
*G06F 21/62* (2013.01)
*G06F 3/06* (2006.01)
*G06F 21/10* (2013.01)
*H04L 9/18* (2006.01)
*G06F 21/79* (2013.01)
*G11B 20/00* (2006.01)
*H04L 9/06* (2006.01)
*G06F 12/02* (2006.01)
*H04L 9/12* (2006.01)

(52) U.S. Cl.
CPC ..... *G06F21/6218* (2013.01); *G06F 2221/2107* (2013.01); *G06F 21/10* (2013.01); *H04L 9/18* (2013.01); *G06F 21/79* (2013.01); *G11B 20/0021* (2013.01); *H04L 9/06* (2013.01); *G11B 20/00086* (2013.01); *G06F 12/0246* (2013.01); *H04L 9/12* (2013.01)

USPC ........... 713/193; 713/165; 380/262; 380/264; 380/44; 380/28; 726/22; 726/26; 726/34; 711/103; 711/163; 711/164; 707/698

(56) References Cited

U.S. PATENT DOCUMENTS

| | | | |
|---|---|---|---|
| 7,647,646 | B2 | 1/2010 | Nakano et al. |
| 8,261,098 | B2 * | 9/2012 | Min et al. ................... 713/193 |
| 2003/0188178 | A1 | 10/2003 | Strongin et al. |
| 2004/0186994 | A1 | 9/2004 | Herbert et al. |
| 2005/0033973 | A1 * | 2/2005 | Kamada et al. ............. 713/193 |
| 2006/0036830 | A1 * | 2/2006 | Dinechin et al. ............ 711/200 |
| 2007/0192592 | A1 | 8/2007 | Goettfert et al. |
| 2007/0294496 | A1 | 12/2007 | Goss et al. |

FOREIGN PATENT DOCUMENTS

| | | |
|---|---|---|
| KR | 1020050050530 | 5/2005 |
| KR | 1020060059779 | 6/2006 |
| WO | WO 2006/118436 | 11/2006 |

* cited by examiner

METHOD AND APPARATUS FOR ENCRYPTING AND PROCESSING DATA IN FLASH TRANSLATION LAYER

PRIORITY

This application is a Continuation Application of U.S. application Ser. No. 12/017,723 filed in the U.S. Patent and Trademark Office on Jan. 22, 2008 and claims priority under 35 U.S.C. §119(a) to an application filed in the Korean Intellectual Property Office on Jan. 22, 2007 and assigned Serial No. 10-2007-00006593, the content of each of which is incorporated herein by reference.

BACKGROUND OF THE INVENTION

1. Field of the Invention

The present invention relates to a flash translation layer, and more particularly to a flash memory for processing optional data and a method thereof.

2. Description of the Related Art

Generally, flash memories are storage devices, which maintain their data even during power-off. Specifically, the flash memories have low power consumption and therefore, retain their stored data, even when their power supplies are interrupted. That is, unlike Dynamic Random Access Memories (DRAMs) the flash memories are non-volatile memory devices and because the flash memories retain their stored data even when their power supplies are interrupted, they are widely used in electronic devices such as digital televisions, digital camcorders, hand-held sets (e.g., cellular phones), digital cameras, Personal Digital Assistants (PDAs), game machines, MP3 players and the like.

However, when optional data are stored in a conventional flash memory, since original data are stored without any processing, a user can extract the data from the flash memory and simply recognize the meanings of the extracted data. In particular, when a code and a debug symbol table are stored in the flash memory, the user can perform reverse engineering by reading the data stored in the flash memory.

SUMMARY OF THE INVENTION

Accordingly, the present invention has been made to solve the above-mentioned problems occurring in the prior art, and an aspect of the present invention is to provide a method for encrypting the optional stored data, such that even when the user extracts the optional stored data, the data is not easily interpreted.

According to an aspect of the present invention, there is provided a method for managing data associated with a flash memory in a flash translation layer, the method comprising searching at least one page of the flash memory when writing data to the flash memory, determining whether authority information corresponding to respective searched pages includes an encryption storage function, generating, corresponding to respective searched pages, a page key according to an encrypting function when the authority information includes the encryption storage function encrypting the data using the generated page key and storing the encrypted data in the respective searched pages, and storing the data in the respective searched pages without encryption when the authority information does not include the encryption storage function.

According to another aspect of the present invention, there is provided an apparatus for managing data associated with a flash memory, comprising a flash memory, a controller, and a flash translation layer for searching at least one page of the flash memory for storing the data when a write of optional data is requested from the controller, determining whether authority information corresponding to respective searched pages includes an encryption storage function, generating, corresponding to respective searched pages, a page key according to an encrypting function when the authority information includes the encryption storage function, encrypting the data using the page key, storing the encrypted data in the respective searched pages, and storing the data in the respective searched pages without encryption when the authority information does not include the encryption storage function.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
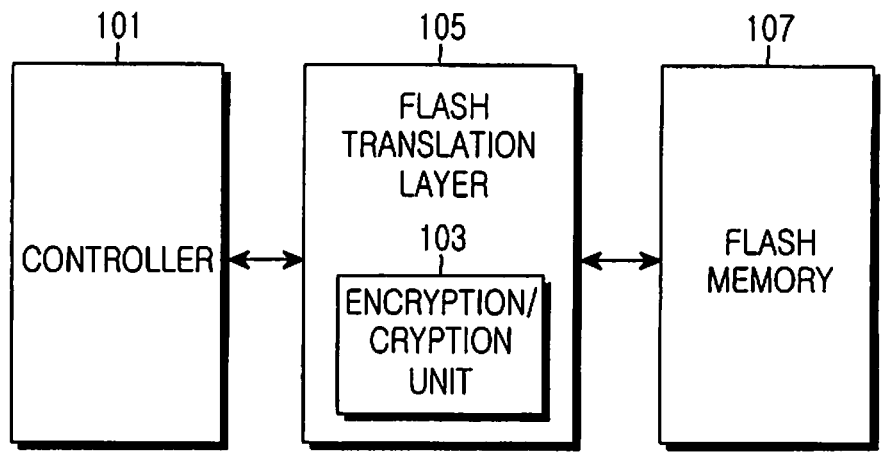
FIG. 1 is a block diagram of a terminal according to the present invention.

Hereinafter, preferred embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it should be apparent to those skilled in the art that the present invention can be implemented without such definitions. Further, in the following description of the present invention, a detailed description of known functions and configurations incorporated herein will be omitted when it may make the subject matter of the present invention rather unclear.

Structural elements of the terminal will be described with reference to FIG. 1.

The terminal includes a controller 101, a flash translation layer (FTL) 105, and a flash memory 107. FTL 105 is connected to controller 101. Flash memory 107 is connected to FTL 105.

The Flash memory 107 can store optional data or load optional written data under the control of controller 101. In particular, flash memory 107 may receive and store encrypted data under the control of controller 101 or load optional encrypted and stored data.

Figure 2A:
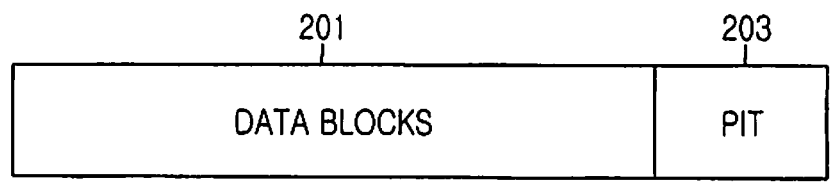
FIG. 2A shows data format of a flash memory unit according to the present invention.

Referring to FIG. 2A, flash memory 107 includes data blocks 201 and a Partition Information Table (PIT) 203. Data blocks 201 include a plurality of blocks, and are an area for storing optional data when a write is requested from a user. Data blocks 201 may be divided into a plurality of partitions. Data blocks 201 may be authorized to have different functions according to partition regions. For example, when data blocks 201 is divided into two partitions, it is authorized to enable one partition region to have a read function, a write function, and an encryption storage function for storing optional encrypted data, and another partition region to have only the read function and the write function.

PIT 203 includes information about flash memory 107. In detail, PIT 203 includes physical address information and the partition number information of data blocks 201, Logical Block Number (LBN) information and authority information of each partition.

Authority information of each partition indicates authority that a corresponding partition region has. For example, when an optional partition region supports a read function R, a write function, and an encryption storage function C, authority information can be generated to include the fact that a corresponding partition region provides the aforementioned functions. Further, a terminal analyzes authority information of PIT 203 to confirm functions, which an optional partition region provides.

Figure 2B:
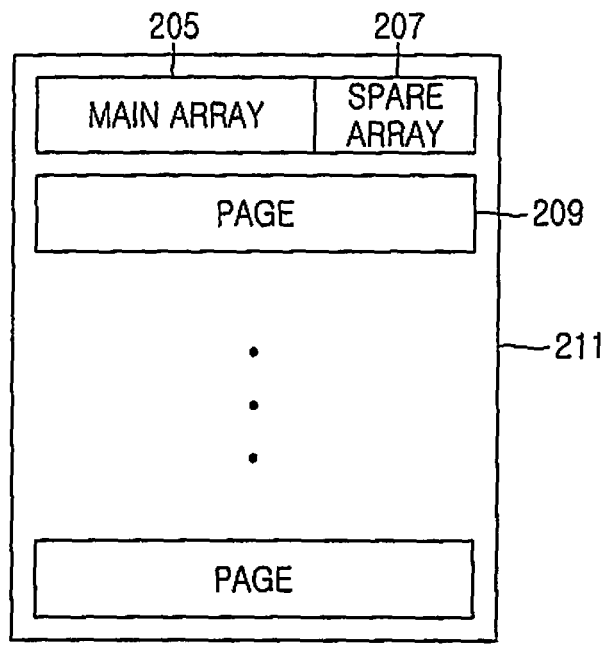
FIG. 2B is a data block of the flash memory according to the present invention.

Moreover, in a detailed construction of data blocks 201 as shown in FIG. 2B, an optional block 211 includes a plurality of pages 209. Each of pages 209 is divided into a main array 205 and a spare array 207. Main array 205 is an area for practically storing predetermined data, and spare array 207 is an area for storing Meta information with respect to main array 205.

Figure 2C:
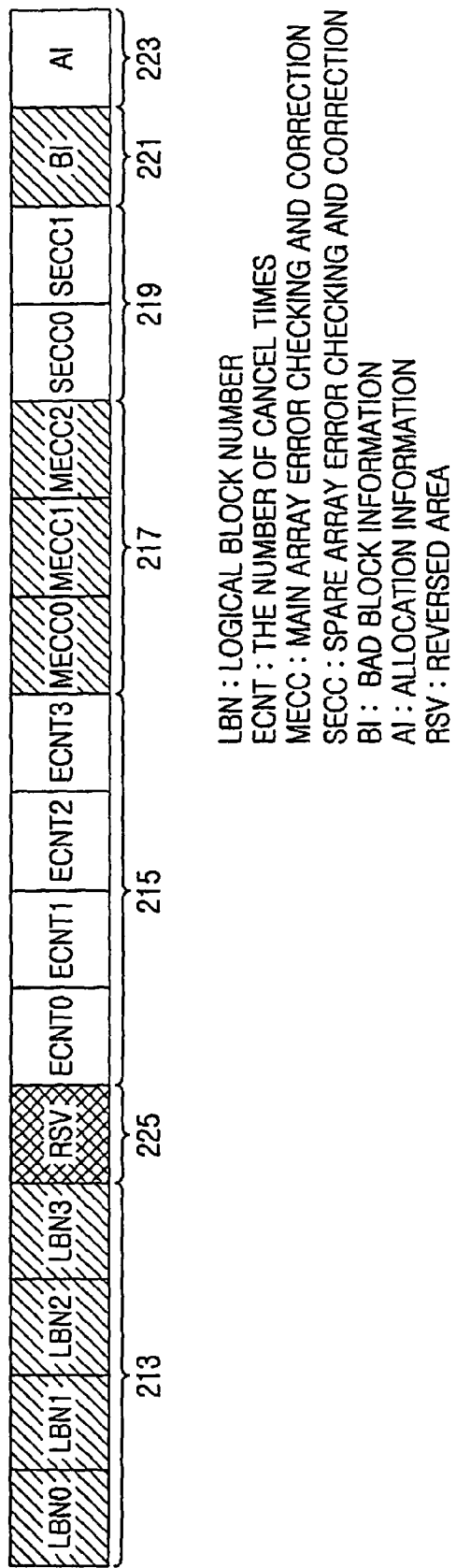
FIG. 2C shows a spare array included in a page of a flash memory according to the present invention.

The Meta information stored in spare array 207 will be explained with reference to FIG. 2C. The Meta information includes logical block number information 213 and the number information 215 (ECNT0-ECNT3) of cancel times. The logical block number information 213 (LBN0-LBN3) indicates a logical block number of a block including a current page. Number information 215 of cancel times indicates the number of cancel times of a block including a current page. Spare array 207 includes a Main array Error Checking and Correction (MECC) 217 and a Spare array Error Checking and Correction (SECC) 219. MECC 217 is used to check and correct an error of a main array included in a current page. SECC 219 is used to check and correct an error of a spare array included in the current page. Spare array 207 includes bad Block Information (BI) 221 and Allocation Information AI 223. BI 221 functions to indicate whether or not a block included in the current page is bad. The AI functions to indicate a state of the current page. Further, spare array 207 may include a reserved area RSV for storing additional information.

Where storage areas of BI 221 and AI 223 have 1 byte, and when BI 221 is 0xFF, it is indicated that the block is normal. In contrast to this, when BI 221 is not 0xFF, it is indicated that the block is abnormal. Further, when the AI 223 is 0xFF, it may indicate that the current page is not used, and also, when the AI 223 is 0xFF, it may indicate that optional data are stored in the current page. When AI 223 is 0x00, it may indicate that storage of the optional data in the current page is terminated.

The internal construction of flash memory 107 has been described with reference to FIG. 2A to FIG. 2C. FIG. 2A to FIG. 2C refer to one embodiment. An area in which information about flash memory 107 is disposed can be changed according to how flash memory 107 is constructed.

Returning to FIG. 1, flash translation layer 105 provides an interface to a file system and an application program so that flash memory 107 can be used as a block device such as a Hard Disk Drive (HDD) or a Random Access Memory (RAM). In other words, flash translation layer 105 causes controller 101 to recognize flash memory 107 as an HDD or RAM. That is, flash translation layer 105 causes controller 101 to access flash memory 107 in the same manner as that of the HDD or the RAM. Flash translation layer 105 has a logical address-physical address event information management function, a bad block management function, and a data wear leveling function.

In particular, flash translation layer 105 according to the present invention includes an encryption/decryption unit 103. When controller 101 requests a write command from flash translation layer 105, flash translation layer 105 receives, encrypts, and stores optional data in flash memory 107. Here, the write command is a command to store the optional data in flash memory 107. When controller 101 request a read command from flash translation layer 105, flash translation layer 105 loads, decodes, and outputs optional encrypted data from flash memory 107 to controller 101. Here, the read command is a command to load the optional data previously stored in flash memory 107.

Encryption/decryption unit 103 of flash translation layer 105 provides an encrypting function to perform an encryption/decryption, and can encrypt or decode optional data using the encrypting function. Encryption/decryption unit 103 cannot encrypt the optional data by a root key, and input a root key and optional data in the encrypting function to generate a processed root key. Further, encryption/decryption unit 103 may encrypt the optional data by the processed root key, and decode optional encrypted data.

For example, encryption/decryption unit 103 may provide a one-way hash function as the encrypting function. The one-way hash function indicates an equation in which a reverse operation is impossible. Specifically, the one-way hash function outputs a corresponding value to only one way as optional input value. Here, one way means that anyone can calculate a hash value for one way but cannot analogize an input value with respect to the hash value.

In particular, flash translation layer 105 receives a write command from controller 101; it searches a page 209 in which optional data are stored among pages included in flash memory 107. Further, flash translation layer 105 calculates a physical address corresponding to the searched page. Moreover, flash translation layer 105 analyzes spare array 107 included in searched page 209 to search logical block number information 213 and number information 215 of cancel times. Flash translation layer 105 calculates a logical block number corresponding to a current page and the number of cancel times of a block included in the current page. Flash translation layer 105 inputs a root key in the encrypting function together with the calculated physical address, logical block number, and the number of cancel times to generate a processed root key. The processed root key is referred to as the 'page key'.

For example, when a one-way hash function is used as the encrypting function, flash translation layer 105 inputs the calculated physical address, logical block number, the number of cancel times, and root key in the one-way hash function to generate a processed root key hash value. The hash value can be also referred to as the 'page key'.

Flash translation layer 105 encrypts optional data by the page key, and stores the optional encrypted data in searched page 209.

Further, when flash translation layer 105 receives a read command from controller 101, it searches a page including data for which a read is requested among the pages included in flash memory 107. Next, flash translation layer 105 calculates a physical address corresponding to searched page 209. Also, flash translation layer 105 analyzes a spare array 207 included in searched page 209 to search logical number information 213 and number information 215 of cancel times in a current page. Then, flash translation layer 105 calculates a logical block number corresponding to the current page and the number of cancel times of a block including the current page using the searched logical number information 213 and number information 215 of cancel times. Subsequently, flash translation layer 105 inputs the calculated physical address, logical block number, and the number of cancel times in the encrypting function to generate a processed root key.

Furthermore, flash translation layer 105 loads optical data included in searched page 201, and decodes and outputs the optional loaded data by a page key to controller 101.

Controller 101 controls respective structural elements of a terminal so as to provide various functions of the terminal. In particular, controller 101 of the present invention controls flash translation layer 105 to encrypt and store optional data in flash memory 107. Otherwise, controller 101 controls flash translation layer 105 to load and decode optional data encrypted and stored in flash memory 107, and to receive, change, and output corresponding data.

So far, the structural elements of the terminal according to the present invention have been explained with reference to FIG. 1 to FIG. 2C. Hereinafter, the following is a procedure of storing or loading data by the terminal according to the present invention.

Figure 3:
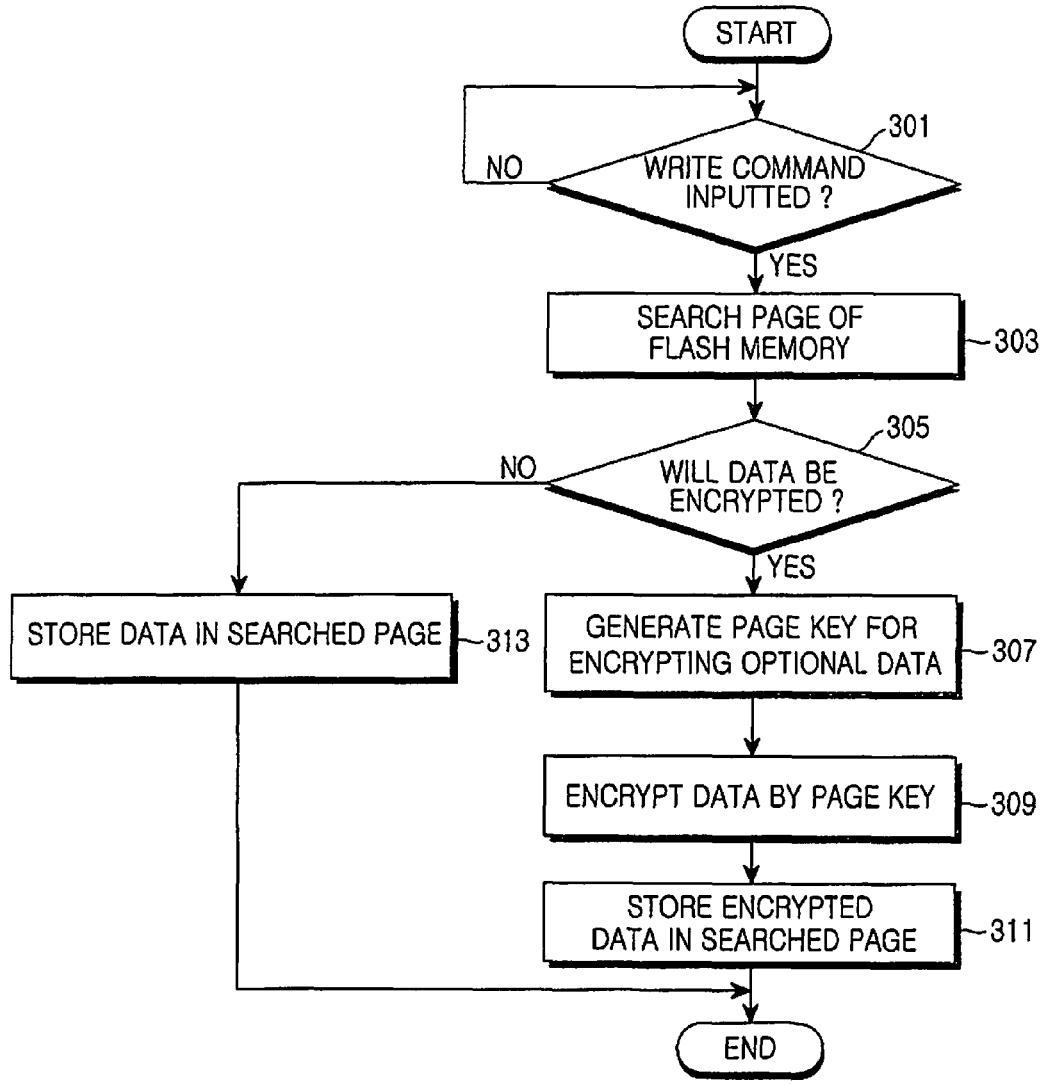
FIG. 3 is a flow chart of an operation where the terminal writes optimal data in the flash memory.

An operation of encrypting and storing optional data when storing the optional data in flash memory 107 will be now explained with reference to FIG. 3.

In order to simply explain the present invention, it is assumed that the size of optional data and the size of optional encrypted data are not greater than that of a page region, and there is an authority for performing a write function in a partition including a block having a page for storing the optional data.

In step 301, flash translation layer 105 confirms whether a write command is inputted from controller 101. Here, the write command is a command to store optional data in flash memory 107. When the write command is not input, step 301 is repeatedly performed until the write command is input. When the write command is inputted, the routine goes to step 303.

At step 303, flash translation layer 105 searches a page in which optional data are stored among pages of flash memory 107.

Specifically, flash translation layer 105 receives a Logical Page Number (LPN) from controller 101, which is a page number in which optional data are stored. Flash translation layer 105 searches a page 209 corresponding to the received logical page number, and receives data included in main array 205 and spare array 207 of searched page 209. Next, flash translation layer 105 confirms a logical block number by logical block number information included in spare array 207, and calculates a physical address of a current page in the confirmed logical block number. A method for calculating the physical address by flash translation layer 105 can be changed according to sizes of a block area and a page area in flash memory 107.

In step 305, a decision is made to determine if the data will be encrypted. For example, flash translation layer 105 analyzes a partition information table 203 to confirm authority information of a partition including a current page. If the optional data should be stored without the encryption, the process goes to step 313. When it is confirmed that encryption is necessary when storing optional data in a partition according to the authority information, flash translation layer 105 goes to step 307.

When the process goes to step 313, flash translation layer 105 receives optional data from controller 101, and stores the optional received data in a main array of a current page 209.

When the process goes to step 307, flash translation layer 105 generates a page key for encrypting optional data.

Specifically, flash translation layer 105 detects the number information of cancel times included in spare array 209, and calculates the number of cancel times of a block including the current page 209. Further, flash translation layer 105 inputs the physical address, logical block number, the number of cancel times calculated in step 303, and a predetermined root key in the encrypting function to generate a page key, and the process goes to step 309.

Next, in step 309, flash translation layer 105 receives optional data from the controller 101, and encrypts the optional received data by the page key generated in step 307, and the process goes to step 311.

Subsequently, in step 311, flash translation layer 105 stores the optional data encrypted in step 309 in a page 201 of flash memory 107 searched in step 301.

Through the aforementioned operation, when the terminal stores optional data in flash memory 107, it can encrypt and store the optional data.

Figure 4:
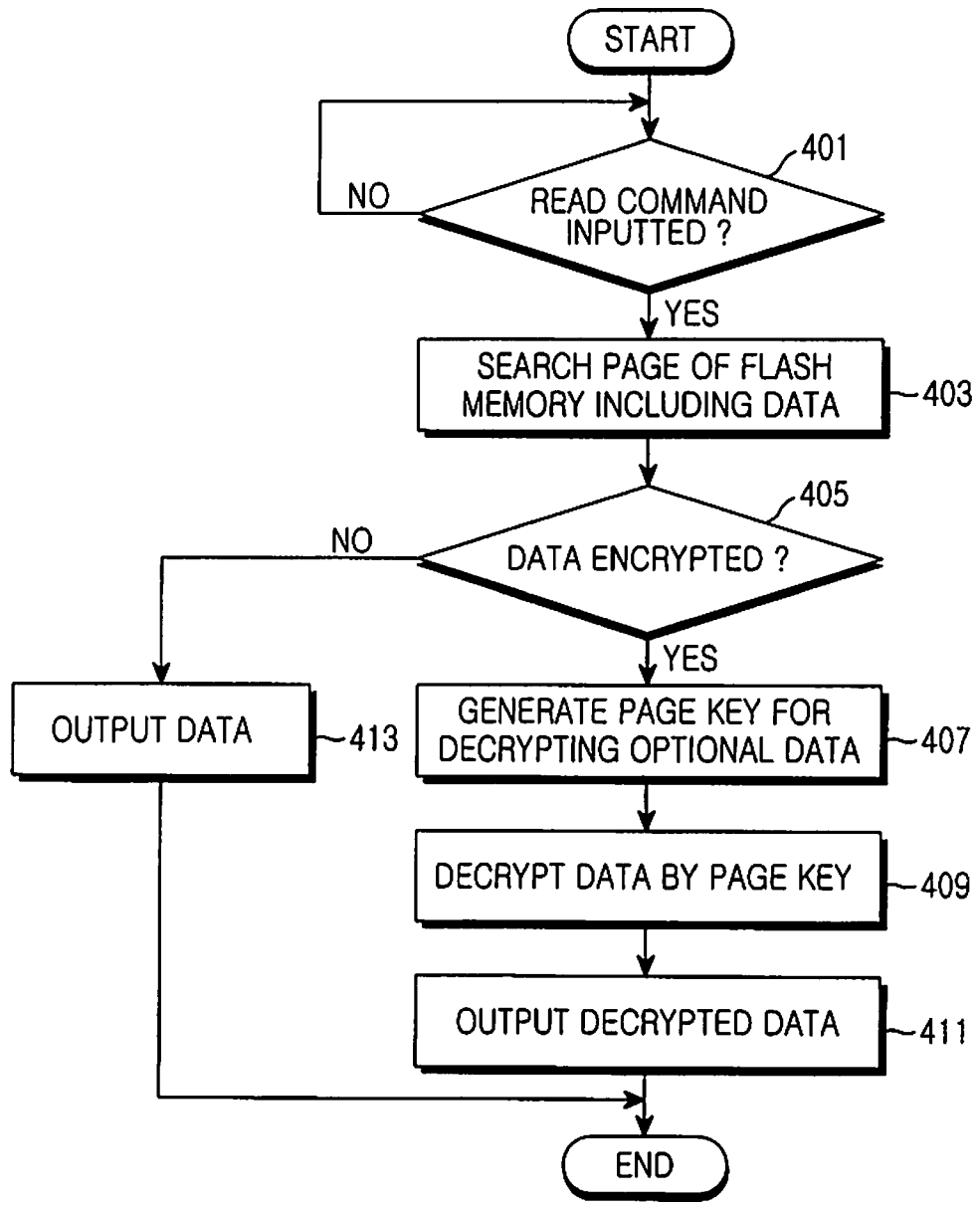
FIG. 4 is a flow chart of an operation where the terminal reads optimal data from the flash memory.

Referring to FIG. 4, a description of an operation of detecting and decoding optional encrypted data when optional data are loaded from the flash memory 107 follows.

In order to simply explain the present invention, it is assumed that the size of optional data and the size of optional encrypted data are not greater than that of a page region, and there is an authority for performing a write function in a partition including a block having a page for storing the optional data.

In step 401, flash translation layer 105 confirms whether a read command is inputted from controller 101. Here, the read command is a command to load optional data stored in a flash memory 107 from controller 101. When the read command is not input, the flash translation layer 105 repeats step 401 until the read command is input. When the read command is inputted, flash translation layer 105 goes to step 403.

In step 403, flash translation layer 105 searches a page storing optional data for which a read is currently requested among pages of flash memory 107.

Specifically, flash translation layer 105 receives a Logical Page Number (LPN) from controller 101. Here, the LPN is a page number in which optional data are stored. Next, flash translation layer 105 searches a page 209 corresponding to the received logical page number, and receives data included in a main array 205 and a spare array 207 of searched page 209. Further, flash translation layer 105 confirms a logical block number as logical block number information included in spare array 207, and calculates a physical address of a current page in the confirmed logical block number. A method for calculating the physical address by flash translation layer 105 can be changed according to a size of a block area and of a page area in flash memory 107.

Subsequently, in step 405, flash translation layer 105 confirms whether the optional data are encrypted. When the optional data are not encrypted, flash translation layer 105 goes to step 413. When the optional data are encrypted, flash translation layer 105 goes to step 407.

For example, flash translation layer 105 analyzes partition information table 203 to confirm authority information of a partition to which current page 209 belongs. When it is confirmed that the optional data stored in current page 209 are encrypted according to the authority information, flash translation layer 105 goes to step 407. When the process goes to step 413, flash translation layer 105 outputs optional data received from main array 205 of a corresponding page 209 to controller 101.

When the process goes to step 407, flash translation layer 105 generates a page key for decoding the optional data.

Specifically, flash translation layer 105 detects the number of cancel times included in spare array 209, and calculates the number of cancel times of a block including a current page 209 according to the number information of cancel times detected. Next, flash translation layer 105 inputs the physical address, the logical block number, and the number of cancel times calculated in step 403 and a predetermined root key in the encrypting function to generate a page key, and goes to step 409.

Subsequently, in step 409, the flash translation layer 105 decodes the optional data received from the main array 205 of a corresponding page 209 in step 401 by a page key generated in step 407, and goes to step 411.

In step 411, flash translation layer 105 outputs the optional data decoded in step 409 to controller 101, so that controller 101 can perform a corresponding function.

Through the aforementioned operation, the terminal can decode and load the optional data, which are encrypted and stored from flash memory 107.

For example, in the embodiment of the present invention, the flash memory included in the terminal can be attachable/detachable flash memory.

As is clear from the foregoing description, the present invention prevents a user from interpreting information in optional data stored in a flash memory even when the user extracts the optional data.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method for managing data associated with a flash memory in a flash translation layer, the method comprising the steps of:
   receiving a request for a reading of data stored in the flash memory;
   searching a page of the flash memory in which the data is stored, in response to the request;
   determining whether the searched page supports an encryption storage function;
   generating a page key based on an encrypting function for the searched page, when the searched page supports the encryption storage function;
   decoding the data using the generated page key; and
   loading the decoded data.

2. The method of claim 1, further comprising loading the data, when the searched page does not support the encryption storage function.

3. The method of claim 1, wherein the encrypting function includes a one-way hash function.

4. The method of claim 3, wherein generating the page key comprises:
   detecting information used to encrypt the data stored in the searched page, the information including at least one of a physical address corresponding to the searched page, a number of cancel times of a block including the searched page, and a logical block number of the block including the searched page; and
   inputting the detected information and a predetermined set root key in the one-way hash function to generate the page key.

5. A method for managing data associated with a flash memory in a flash translation layer, the method comprising the steps of:
   receiving a request for writing data to the flash memory;
   searching a page of the flash memory, in response to the request;
   determining whether the searched page supports an encryption storage function;
   generating a page key based on an encrypting function for the searched page, when the searched page supports the encryption storage function;
   encrypting the data using the generated page key; and
   storing the encrypted data in the searched page.

6. The method of claim 5, further comprising storing the data in the searched page without encryption, when the searched page does not support the encryption storage function.

7. The method of claim 5, wherein the encrypting function includes a one-way hash function.

8. The method of claim 7, wherein generating the page key comprises:
   detecting information including at least one of a physical address corresponding to the searched page, a number of cancel times of a block including the searched page, and a logical block number of the block including the searched page; and
   inputting the detected information and a predetermined set root key in the one-way hash function to generate the page key corresponding to the searched page.

9. An apparatus for managing data associated with a flash memory, the apparatus comprising:
   a flash memory;
   a controller; and
   a flash translation layer for receiving a request for a reading of data stored in the flash memory, searching a page of the flash memory in which the data is stored, in response to the request, determining whether the searched page supports an encryption storage function, generating a page key based on an encrypting function for the searched page, when the searched page supports the encryption storage function, decoding the data using the generated page key, and loading the decoded data.

10. The apparatus of claim 9, wherein the flash translation layer loads the data, when the searched page does not support the encryption storage function.

11. The apparatus of claim 9, wherein the encrypting function includes a one-way hash function.

12. The apparatus of claim 11, wherein the flash translation layer detects information used to encrypt the data stored in the searched page, the information including at least one of a physical address corresponding to the searched page, a number of cancel times of a block including the searched page, and a logical block number of the block including the searched page, and inputs the detected information and a predetermined set root key in the one-way hash function to generate the page key.

13. An apparatus for managing data associated with a flash memory, the apparatus comprising:
   a flash memory;
   a controller; and
   a flash translation layer for receiving a request for writing data to the flash memory, searching a page of the flash memory, in response to the request, determining whether the searched page supports an encryption storage function, generating a page key based on an encrypting function for the searched page, when the searched page supports the encryption storage function, encrypting the data using the generated page key, and storing the encrypted data in the searched page.

14. The apparatus of claim 13, wherein the flash translation layer stores the data in the searched page, without encryption, when the searched page does not support the encryption.

15. The apparatus of claim 13, wherein the encrypting function includes a one-way hash function.

16. The apparatus of claim 15, wherein the flash translation layer detects information including at least one of a physical address corresponding to the searched page, a number of cancel times of a block including the searched page, and a logical block number of the block including the searched page, and inputs the detected information and a predetermined set root key in the one-way hash function to generate the page key corresponding to the respective searched pages.

* * * * *